United States Patent [19]

Rekers et al.

[11] Patent Number: 5,081,089
[45] Date of Patent: Jan. 14, 1992

[54] CHROMIUM CATALYST COMPOSITIONS AND POLYMERIZATION UTILIZING SAME

[75] Inventors: Louis J. Rekers, Wyoming; Stanley J. Katzen, Cincinnati, both of Ohio

[73] Assignee: National Distillers and Chemical Corporation, New York, N.Y.

[21] Appl. No.: 570,935

[22] Filed: Aug. 22, 1990

Related U.S. Application Data

[60] Division of Ser. No. 338,476, Apr. 14, 1989, Pat. No. 4,981,927, which is a continuation of Ser. No. 52,654, May 20, 1987, abandoned.

[51] Int. Cl.$^5$ ................................................ C08F 4/69
[52] U.S. Cl. .................................... 502/117; 502/162; 502/256; 526/129
[58] Field of Search ........................ 502/117, 256, 162

[56] References Cited

U.S. PATENT DOCUMENTS 3,984,351 10/1976 Rekers et al. .................... 502/117 X
3,985,676 10/1976 Rekers et al. .................... 502/117 X
4,295,997 10/1981 McDaniel et al. .............. 502/256 X Primary Examiner—Patrick P. Garvin
Attorney, Agent, or Firm—Kenneth D. Tremain; Gerald A. Baracka

[57] ABSTRACT

Improved mixed chromium catalysts useful in particle form polymerizations to produce readily processable high density polyolefin resins which also have high resistance to environmental stress cracking are provided. First and second chromium-containing catalyst components obtained using silica supports of different pore volumes and wherein one of the catalyst components also contains aluminum are employed for the preparation of the mixed catalysts. The polymerization process and products obtained using the above-described mixed catalysts are also described.

13 Claims, No Drawings

CHROMIUM CATALYST COMPOSITIONS AND POLYMERIZATION UTILIZING SAME

This is a division of copending application Ser. No. 338,476, filed Apr. 14, 1989 and now U.S. Pat. No. 4,981,927, which is a continuation of application Ser. No. 052,654, filed May 20, 1987, now abandoned.

BACKGROUND OF THE INVENTION

1. Field of the Invention

This invention relates to improved chromium catalyst compositions and processes for utilizing same. The chromium catalysts are useful in the particle form polymerization process for the manufacture of high density polyolefin resins which exhibit high resistance to environmental stress cracking and which are useful for the production of blow molded articles. More specifically, the chromium catalyst compositions are mixed catalysts comprised of a first and a second chromium-containing supported catalyst component obtained using silica supports of different pore volumes and wherein one of the supported catalyst components also contains aluminum.

2. Description of the Prior Art

In the selection and production of resins for the manufacture of blow molded goods, more so than with any other fabrication method, a careful balance must be struck between the physical properties of the solid resin and the processing characteristics of the resin melt if efficient production of durable molded articles is to be achieved. While many resins have superior physical properties, they do not have acceptable rheological (viscoelastic) properties under conditions of flow and shear such as are encountered during blow molding. Conversely, other resins which exhibit satisfactory viscoelastic behavior are deficient in one or more essential physical characteristics. For this reason there is a continuing effort to develop resins which have an optimal balance of physical and rheological properties. This is especially true with polyethylene resins used for the manufacture of blow molded bottles.

Improved processability of polyolefin resins, i.e., improved flow properties and shear response, has been obtained by increasing the molecular weight distribution of the polymer. This can be accomplished by blending separately prepared polymers of different molecular weights or by utilizing catalyst systems capable of directly producing polymers having broadened molecular weight distributions. U.S. Pat. No. 4,025,707, for example, discloses the preparation of ethylene homopolymers and copolymers of broadened molecular weight distribution utilizing a mixed catalyst comprising several portions of the same or different chromium components and metal promoted variations thereof wherein each portion is activated at a different temperature. U.S. Pat. No. 4,560,733 discloses magnesium- and titanium-containing catalyst components for a similar purpose which are prepared by milling a blend of at least two different silica-containing components having different melt index potentials.

While it has been possible to improve processing characteristics in this manner, any processing advantage has heretofore been offset in large part by a corresponding decrease in one or more essential physical properties. For example, while the products obtained in accordance with U.S. Pat. No. 4,025,707 have good die swell characteristics and acceptable environmental stress cracking resistance and flow properties, polymer densities are too low to provide the necessary stiffness for blown bottles. On the other hand, polymers such as those produced using the catalysts of U.S. Pat. No. 4,560,733 have sufficiently high densities (0.960 and higher) but typically are deficient in their resistance to environmental stress cracking.

In addition to having acceptable processing characteristics, the resin must also have sufficiently high density and high resistance to environmental stress cracking in order to produce useful blown bottles. A density of at least 0.957 is necessary to obtain the high degree of stiffness required by molders. It is considered even more desirable for the resin to have a density of 0.958 to 0.961. Stiffness imparts strength to bottles and also makes thinner wall constructions possible. More units per pound of resin can thus be obtained which represents an economic advantage to the processor. The resin must also exhibit resistance to cracking under environmental stress, that is, while being stretched or bent in several directions at once.

While stiffness increases with density as noted above, an inverse relationship exists between density and resistance to environmental stress cracking, i.e., as density is increased, resistance to environmental stress cracking is reduced. These relationships assume that the melt index of the resins are the same or essentially the same. A balance must therefore be struck between the density, i.e., stiffness, of the resin and the resistance of the resin to environmental stress cracking.

It would be advantageous if polyethylene resins having an optimal balance of rheological and physical properties could be produced. It would be even more advantageous if high density resins having high resistance to stress cracking and which are useful for the manufacture of blown bottles could be obtained utilizing mixtures of known catalyst components. These and other advantages are realized using the mixed catalyst composition of the present invention which are described in detail to follow.

SUMMARY OF THE INVENTION

It is an object of the present invention to provide highly useful polyethylene resins for blow molding applications having an optimal balance of rheological and physical properties. It is a further object to produce readily processable high density resins which are particularly useful for the manufacture of blown bottles and which have high resistance to environmental stress cracking. These and other objectives are achieved by the use of mixed chromium catalysts obtained from known supported chromium-containing catalyst components. More specifically, the present improved catalyst compositions are mixtures of first and second chromium-containing silica-supported catalyst components present at a weight ratio of 3:1 to 1:3. The catalyst components contain from about 0.5 to 1.25 weight percent chromium and one of said catalyst components also contains from 0.5 to 6 weight percent aluminum. The silica supports employed for the catalyst components have pore volumes which differ by at least 0.3 cc/g. The individual catalyst components may be heat activated or the components may be combined and the resulting mixture heat activated. Reducing agents, most notably trialkyl boranes, can advantageously be employed with the mixed catalyst if desired.

It is particularly advantageous if the first catalyst component has 0.5 to 1.2 weight percent chromium and 2 to 4.5 weight percent aluminum on a silica support of pore volume greater than 2.0 cc/g and the second catalyst component has 0.75 to 1.25 weight percent chromium on a microspheroidal silica support having a pore volume of 1.5 cc/g to 1.9 cc/g. Silica supports having pore volumes from 2.1 cc/g to 2.9 cc/g are especially useful for preparation of the first catalyst component whereas microspheroidal silica supports having pore volumes of 1.6 cc/g to 1.8 cc/g are most advantageous for the second catalyst component. The first catalyst component is preferably obtained by depositing an organophosphoryl chromium compound and aluminum alkoxide compound on the high pore volume silica and the second catalyst component most preferably is obtained by depositing chromium acetate on the microspheroidal silica.

DETAILED DESCRIPTION

In accordance with the present invention, polyethylene resins having good processing characteristics, high density and high resistance to environmental stress cracking are obtained using mixed chromium catalysts obtained by judicious utilization of known supported chromium-containing catalyst components. Whereas the individual catalyst components are known, it has unexpectedly been discovered that by combining these catalysts in specific ratios that the resulting mixed catalysts produce resins which, in addition to having excellent processing characteristics by virtue of a broadened molecular weight distribution, also have high densities and high resistance to environmental stress cracking. This balance of desirable processability with both high density and high resistance to stress cracking makes the resins highly useful in blow molding applications and particularly for the production of blown bottles.

Polyethylene resins having densities of at least 0.957, high environmental stress cracking resistance (ESCR), and acceptable flow properties and shear response are obtained in the particle form polymerization process using the present improved catalyst compositions which are mixtures of first and second chromium-containing silica-supported catalyst components wherein the silica supports for said catalyst components differ in pore volumes by at least 0.3 cc/g and one of the catalyst components also contains aluminum. More particularly, resins produced in accordance with the present invention have densities from 0.958 to 0.961 and ESCR values greater than 8 hours and, more preferably, greater than 10 hours. ESCR values referred to herein are bottle ESCR F50 values as determined in accordance with ASTM D-2561, Procedure C (modified).

In addition to having densities and bottle ESCRs within the above-specified ranges, the resins also typically have melt indexes (pellet) in the range 0.2 to 0.4 and melt index ratios (MIRs) in the range 80 to 125. MIR is generally considered to be an approximation of molecular weight distribution and is the ratio between the high load melt index (HLMI) determined in accordance with ASTM D1238-57T, condition F, and the MI determined in accordance with ASTM D1238-57T, condition E. In general, with resins of comparable MI, polymers with broader molecular weight distributions have higher MIRs and better flow properties than their lower MIR counterparts.

While it is generally recognized that flow properties can be improved by using two or more silica supports for the catalyst and that the melt index is affected by the pore volume of the silica, it is unexpected that by the use of mixed catalysts based on two known catalyst components that resins having the above-described highly desirable balance of rheological and physical properties can be obtained. Heretofore, any processing advantage which has been obtained has been accompanied by a corresponding undesirable decrease in density and/or ESCR.

The catalyst compositions of the present invention are mixtures of two discreet supported catalysts present in specific ratios. Both catalyst components employed for the improved mixed catalyst compositions of the invention have chromium on a silica support. Additionally, one of the catalyst components also has aluminum deposited thereon. The silica supports utilized for the two catalyst components differ in pore volumes by at least 0.3 cc/g. The weight ratio of the first and second supported catalyst component ranges from 3:1 to 1:3 and, more preferably, from 2:1 to 1:2.

The silica support employed for the first catalyst has a pore volume greater than 2.0 cc/g. These supports, generally referred to as high pore volume silica supports, are well known silica xerogels obtained in accordance with known procedures such as those described in U.S. Pat. Nos. 3,652,214, 3,652,215 and 3,652,216, details of which are incorporated herein by reference. Especially useful high pore volume silicas for the catalysts of this invention have pore volumes from 2.1 cc/g to 2.9 cc/g with a major portion of the pore volume being provided by pores having diameters in the range 300Å to 600Å. These high pore volume materials have surface areas in the range 200 to 500 m$^2$/g. Silica supports employed for the second catalyst component are microspheroidal silicas having pore volumes from 1.5 cc/g to 1.9 cc/g. Silica xerogels of this type are also obtained by conventional methods known to the art such as described in U.S. Pat. No. 3,453,077, and are commercially available from Davison Chemical Division, W. R. Grace & Co., under the designation MS-952. Microspheroidal silica of pore volume 1.6 cc/g to 1.8 cc/g is especially useful for preparation of the second catalyst component. While it is not necessary, either or both of the silica supports can be calcined at temperatures ranging from 400° F. to 1800° F. prior to having the metal deposited thereon. In one particularly useful embodiment of the invention the high pore volume silica support of the first catalyst component is calcined before deposition of the chromium and aluminum compounds thereon.

Known chromium-containing compounds capable of reacting with the surface hydroxyl groups of the silica supports can be utilized to deposit the chromium thereon. Examples of such compounds include chromium nitrate, chromium trioxide, chromate esters such as chromium acetate, chromium acetylacetonate and t-butyl chromate, silyl chromate esters, phosphorus-containing chromate esters, and the like.

Known aluminum-containing compounds capable of reacting with the surface hydroxyl group of the silica supports can be employed to deposit the aluminum thereon. Examples of such aluminum compounds include aluminum alkoxides, such as aluminum sec-butoxide, aluminum ethoxide, aluminum isopropoxide; alkyl aluminum alkoxides, such as ethyl aluminum ethoxide, methyl aluminum propoxide, diethyl aluminum ethoxide, diisobutyl aluminum ethoxide, etc.; alkyl aluminum compounds, such as triethyl aluminum, triisobutyl aluminum, etc.; alkyl or aryl aluminum halides, such as diethyl aluminum chloride; aryl aluminum compounds, such as triphenyl aluminum; aryloxy aluminum compounds, such as aluminum phenoxide; and the like. While the aluminum may be deposited on either the first or second catalyst component, it is preferably associated with the first catalyst component and supported on the high pore volume silica.

The first and second catalyst components are obtained by depositing the chromium-containing compound and aluminum-containing compound on the silica support in accordance with conventional known procedures, e.g., vapor coating or deposition from inert organic solvents. Organic solvents which can be employed for this purpose typically include hydrocarbons and their halogenated derivatives. Dichloromethane has been found to be a particularly effective solvent for depositing chromium and aluminum compounds on the supports. The same or different chromium-containing compounds may be used for preparation of the first and second catalyst components. When preparing the catalyst component containing both chromium and aluminum, the chromium compound and aluminum compound may be deposited individually or together. If separate steps are employed, the order of depositing the chromium compound and the aluminum compound can be varied. Furthermore, after the first deposition the support having the metal deposited thereon may be heat activated before proceeding to deposit the second metal compound.

In general, the first and second catalyst components will contain from about 0.5 to 1.25 weight percent chromium. However, in an especially useful embodiment of the invention, the first catalyst component contains from 0.5 to 1.2 weight percent chromium and the second catalyst component contains from 0.75 to 1.25 weight percent chromium. Aluminum is present at a 0.5 to 6 weight percent level. It is particularly advantageous when the aluminum is associated with the first high pore volume catalyst component and is present in an amount from 2 to 4.5 weight percent.

The first and second catalyst components are heat activated by heating at a temperature below the decomposition temperature of the support material in a non-reducing atmosphere. The heat activation may be carried out before the first and second catalyst components are combined or after the first and second catalyst components have been combined. Temperatures generally employed for heat activation range from about 450° F. up to about 1700° F. Higher activation temperatures can be utilized provided the decomposition temperature of the support material is not exceeded. When the first and second catalyst components are combined and co-activated by heating the mixture of the catalyst, temperatures from about 950° F. to 1500° F. are preferably used. When the first and second catalyst components are separately heat activated, temperatures from 950° F. to 1650° F. are most advantageously employed. In the latter situation, the catalyst components may be heat activated at different temperatures within the above-recited range. Also with the catalyst containing both the chromium and aluminum, multiple heat activation steps may be carried out, i.e., after the first metal compound is deposited on the support and before proceeding with deposition of the second metal compound a heat activation operation may be carried out. Similarly, after deposition of the second metal compound, a second heat activation procedure may be conducted or the support having the metal deposited thereon may be combined with the other catalyst component and this mixture heat activated.

The heat activation is carried out in a non-reducing atmosphere, preferably, in an oxygen-containing atmosphere. The time required for heat activation will vary but generally ranges from about 30 minutes up to about 24 hours and, more preferably, from 2 to 12 hours. If the catalyst components are separately heat activated, temperatures and times of activation may differ. The non-reducing atmosphere, which is preferably air or other oxygen-containing gas, should be essentially dry. When air is used, it is preferably dehumidified to less than 3 ppm water.

The mixed catalysts of the present invention are preferably used in combination with metallic and/or non-metallic reducing agents. Examples of metallic reducing agents include trialkyl aluminums, such as triethyl aluminum and triisobutyl aluminum, alkyl aluminum halides, alkyl aluminum alkoxides, dialkyl zincs, dialkyl magnesiums, and borohydrides including those of the alkali metals, especially sodium, lithium and potassium, and aluminum. Non-metal reducing agents include alkyl boranes such as triethyl borane, triisobutyl borane, and trimethyl borane and hydrides of boron such as diborane, pentaborane, hexaborane and decaborane. The mixed catalyst may be combined with the metallic or non-metallic reducing agent prior to being fed to the polymerization vessel or the mixed catalyst and reducing agent may be separately fed to the polymerization reactor. The molar ratio of the metal or non-metal of the reducing agent to chromium can range from 0.01:1 to 2:1.

In one embodiment of the invention wherein particularly useful polyethylene resins having a good balance of physical and rheological properties useful for the manufacture of blow molded bottles are produced, the first catalyst component contains from 0.5 to 1.2 weight percent chromium, obtained by deposition of an organophosphoryl chromium compound, and 2 to 4.5 weight percent aluminum, obtained by deposition of an aluminum alkoxide compound, on a high pore volume silica support having a pore volume from 2.1 cc/g to 2.9 cc/g. It is especially advantageous if the high pore volume silica support is calcined at a temperature from 1200° F. to 1700° F. prior to deposition of the chromium and aluminum compounds. Chromium/aluminum-containing catalysts of this type are known and described in U.S. Pat. No. 3,984,351, details of which are incorporated herein by reference.

In general, the first catalyst component is obtained by depositing an organophosphoryl chromium compound which is the reaction product of chromium trioxide and an organophosphorus compound of the formula

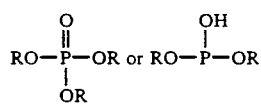

wherein at least one of the R groups is a hydrocarbon radical selected from alkyl, aryl, aralkyl, or alkaryl. Any R groups which are not hydrocarbon radicals are hydrogen. Preferred organophosphorus compounds are trialkyl phosphates such as triethyl phosphate. The aluminum alkoxide compounds correspond to the formula

where R is an alkyl having from 1 to 8 carbon atoms or aryl, aralkyl, or alkaryl having from 6 to 8 carbon atoms. Aluminum sec-butoxide, aluminum isopropoxide, aluminum ethoxide, and aluminum phenoxide are representative aluminum alkoxides and aluminum sec-butoxide is particularly advantageous.

Best results are obtained when the above-described first catalyst component is used in conjunction with a second catalyst component containing from 0.75 to 1.25 weight percent chromium, obtained by deposition of a chromate ester, on a microspheroidal silica support having a pore volume from 1.6 cc/g to 1.8 cc/g. Chromium acetate is a particularly useful chromate ester for this purpose.

Synthetic microspheroidal (amorphous) silica xerogels impregnated with chromium acetate useful as the second catalyst component are commercially available, e.g., EP30 Polyolefin Catalyst from Crosfield Catalysts. It is even more desirable if a trialkyl borane reducing agent is employed in conjunction with the above-described preferred first and second catalyst components and when the molar ratio of the boron to chromium ranges from 0.1:1 to 1.5:1.

Utilizing the above-described preferred mixed catalysts, it is possible to produce easily processable and highly useful polyethylene resins having high density and high resistance to environmental stress cracking. For example, polyethylene resins having densities in the range 0.958 to 0.961 and ESCRs greater than 10 hours with melt indexes from 0.2 to 0.4 and melt index ratios from 80 to 125 are obtained thereby. It is especially desirable that these highly desirable and preferred polyethylene resin products can be obtained using mixed catalysts wherein it is not necessary to heat activate the first and second catalyst components individually. It is extremely useful and beneficial from a commercial point of view that mixed catalysts which are heat activated after the first and second catalyst components are combined produce these highly desirable results since one of the steps in the catalyst preparation procedure can thereby be eliminated. While the polymerization is facilitated by the use of a reducing agent with the mixed catalyst compositions, it has further quite unexpectedly been discovered that, when utilizing the preferred mixed catalysts, polyethylene resins having the above-defined highly desirable properties can nevertheless be produced.

The mixed catalysts are utilized for the polymerization of ethylene in conventional particle form (slurry) processes. Such procedures are well known and are described in the prior art, e.g., U.S. Pat. No. 3,644,323. In general these polymerizations are carried out in a liquid organic medium at a temperature from about 150° F. to 230° F. The catalyst is suspended in the organic medium and the reaction is conducted at a pressure sufficient to maintain the organic diluent and at least a portion of the olefin in the liquid phase. Weight percent ethylene in the reactor is generally maintained from about 1.5 up to about 7. Hydrogen is generally added to the polymerization reaction. The molar ratio of hydrogen to ethylene in the reactor is generally maintained between 0.25 and 1.0. While not necessary for polymerization, a reducing agent is generally included with the catalyst.

The organic medium employed for the polymerization is generally a paraffinic and/or cycloparaffinic material such as propane, butane, isobutane, pentane, isopentane, cyclohexane, methylcyclohexane, and the like. The medium is chosen so that under the conditions employed the polymer is insoluble in the medium and is readily recoverable in the form of solid particles. Isobutane is a particularly advantageous organic medium for the purpose of these polymerizations. Pressures typically range from about 100 to 800 psig and catalyst concentrations can range from about 0.001 to about 1 percent, based on the total weight of the reactor contents. The polymerizations can be conducted as batch or continuous or semi-continuous operations.

The following examples illustrate the mixed catalysts of the present invention more fully and describe their utilization in the particle form process for the preparation of readily processable polyethylene resins having high densities and high resistance to environmental stress cracking.

EXAMPLE I

A mixed catalyst was prepared in accordance with the present invention and utilized for the polymerization of ethylene. The catalyst consisted of a mixture of a supported chromium/aluminum catalyst prepared in accordance with the procedure of U.S. Pat. No. 3,984,351, identified as Component A, and a supported chromium catalyst obtained from commercial sources, identified as Component B. Component A was prepared by calcining a high pore volume silica support at 1650° F. for 6 hours and thereafter impregnating first with the reaction product of $CrO_3$ and triethyl phosphate and then with aluminum sec-butoxide. The impregnations were made by deposition from dichloromethane solutions. The impregnated catalyst was then activated by placing it in a cylindrical container and fluidizing with dry air at 0.2 feet per minute lineal velocity while heating at 1070° F. for 6 hours. The resulting heat-activated chromium/aluminum catalyst had a pore volume of 2.3 cc/g and contained 1.0 percent chromium and 3.7 percent aluminum. Component B was a commercially obtained microspheroidal silica xerogel impregnated with chromium acetate which was activated by fluidizing with dry air at 0.2 feet per minute lineal velocity and heating at 1000° F. for 6 hours. The resulting heat-activated chromium catalyst had a pore volume of 1.7 cc/g and contained 1.0 percent chromium. Catalyst Components A and B were blended at a weight ratio of 3:1 to obtain the mixed catalyst.

The polymerization was carried out in a jacketed loop-type reactor provided with an agitator to cause circulation within the loop and create highly turbulent flow. Isobutane was employed as the hydrocarbon reaction medium. Means were provided to continuously feed isobutane, ethylene, a slurry of the mixed catalyst in isobutane, a solution of triethyl boron in isobutane to the reactor, and hydrogen and for removing a mixture of the polymer, unreacted monomer, and diluent at a controlled rate. Polymerization details were as follows:

| | |
|---|---|
| Temperature (°F.) | 213 |
| Catalyst Concentration (g/kg isobutane) | 0.38 |
| Ethylene in Reactor (Wt. %) | 3.19 |
| $H_2$/Ethylene Molar Ratio | 0.49 |
| Boron/Chromium Molar Ratio | 0.24 |

The polyethylene produced was a free-flowing powder after removal of ethylene and isobutane and had a density of 0.9599 with an ESCR of 10.1. The resin had an MI of 0.26 and MIR of 119 and was readily processable using conventional blow molding equipment for the fabrication of blown bottles.

The above polymerization was repeated except that the conditions were varied as follows:

| Temperature (°F.) | 212 |
|---|---|
| Catalyst Concentration (g/kg isobutane) | 0.40 |
| Ethylene in Reactor (Wt. %) | 2.97 |
| $H_2$/Ethylene Molar Ratio | 0.49 |
| Boron/Chromium Molar Ratio | 0.25 |

The resulting polyethylene resin had a density of 0.9595, ESCR of 10.5, MI 0.20, and MIR of 122.

A useful high density resin was obtained even when the mixed catalyst was employed without triethyl borane reducing agent. For example, when ethylene was polymerized at 214° F. using a catalyst concentration of 0.73 g/kg isobutane with 3.81 weight percent ethylene and $H_2$/ethylene molar ratio of 0.35, a resin having a density of 0.9601, ESCR of 8.9, MI of 0.26, and MIR of 130 was obtained. While the environmental stress crack resistance of the resin was somewhat lower than that obtained above when triethyl borane is used, it nevertheless is considered to be within acceptable limits.

EXAMPLE II

To further demonstrate the ability to obtain high density resins having increased environmental stress crack resistance, a mixed catalyst was prepared by blending Components A and B of Example I at a weight ratio of 1:1. The catalyst was employed for the polymerization of ethylene in accordance with the procedure of Example I under the following conditions:

| Temperature (°F.) | 212 |
|---|---|
| Catalyst Concentration (g/kg isobutane) | 0.41 |
| Ethylene in Reactor (Wt. %) | 2.17 |
| Hydrogen/Ethylene Molar Ratio | 0.89 |

The resulting polyethylene resin had a density of 0.9601 and ESCR of 11.4. The MI and MIR of the resin were 0.26 and 110, respectively.

When the polymerization was repeated except that the weight percent ethylene was increased to 2.82 and the hydrogen/ethylene molar ratio adjusted to 0.69, a resin of density 0.9606, ESCR of 10.1, MI of 0.24, and MIR of 118 was obtained.

EXAMPLE III

A chromium/aluminum-containing catalyst component, identified as Component C, was prepared as described for Component A in Example I except that the high pore volume silica support was not calcined prior to deposition of the chromium and aluminum compounds. After deposition of the chromium and aluminum compounds, Component C was air-dried and combined at a 1:1 weight ratio with a commercial chromium acetate impregnated microspheroidal silica xerogel (1.0% Cr; pore volume 1.7 cc/g). The combined catalyst components were then co-activated by fluidizing the mixture with dry air at 0.2 feet per minute lineal velocity and heating at 1100° F. for 6 hours. The resulting heat-activated mixed catalyst was employed for the polymerization of ethylene. Polymerization conditions and properties of the resulting resin-produced thereby were as follows:

| Temperature (°F.) | 218 |
|---|---|
| Catalyst Concentration (g/kg isobutane) | 0.40 |
| Ethylene in Reactor (Wt. %) | 4.0 |
| $H_2$/Ethylene Molar Ratio | 0.28 |
| Boron/Chromium Molar Ratio | 0.14 |
| Density | 0.9592 |
| ESCR | 12 |
| MI | 0.23 |
| MIR | 113 |

It is evident from the foregoing data that the product produced in accordance with the above-defined polymerization conditions has a superior balance of physical and rheological properties rendering it useful for blow molding applications. When the above-defined catalyst components are individually employed for the polymerization of ethylene under comparable polymerization conditions, resins having the desired balance of physical and rheological properties are not produced. For example, when high density resins having acceptable rheological properties are obtained, the stress crack resistance of the polymers is deficient.

We claim:

1. An improved catalyst composition consisting essentially of a mixture of first and second heat-activated silica-supported catalyst components present in a weight ratio of 3:1 to 1:3; said first supported catalyst containing from about 0.5 to 1.25 weight percent chromium and 0.5 to 6.0 weight percent aluminum on a silica support having a pore volume greater than 2.0 cc/g with a major portion of the pore volume being provided by pores having diameters of 300Å to 600Å; said second supported catalyst component containing from 0.5 to 1.25 weight percent chromium on a microspheroidal silica support having a pore volume from 1.5 cc/g to 1.9 cc/g; and the pore volumes of said silica support of the first catalyst component and said microspheroidal silica support of the second catalyst component differing by at least 0.3 cc/g.

2. The improved catalyst composition of claim 1 wherein a metallic or non-metallic reducing agent is employed with said first and second catalyst components and the molar ratio of the metal or non-metal of said reducing agent to chromium ranges from 0.01:1 to 2:1.

3. The improved catalyst composition of claim 2 wherein the metallic or non-metallic reducing agent is selected from the group consisting of trialkyl aluminums, alkyl aluminum halides, alkyl aluminum alkoxides, dialkyl zincs, dialkyl magnesiums, alkali metal borohydrides, aluminum borohydrides, alkyl boranes, and boron hydrides.

4. The improved catalyst composition of claim 2, wherein the difference in pore volumes of the silica supports of said first and second catalyst components ranges from 0.3 to 1.2 cc/g.

5. The improved catalyst composition of claim 4 wherein said first and second catalyst components are present in a weight ratio from 2:1 to 1:2, the reducing agent is a trialkyl borane, and the molar ratio of boron to chromium ranges from 0.1:1 to 1.5:1.

6. The improved catalyst composition of claim 5 wherein the first catalyst component contains from 0.5 to 1.2 weight percent chromium and 2 to 4.5 weight percent aluminum.

7. The improved catalyst composition of claim 6 wherein the first catalyst component is obtained by the deposition of an organophosphoryl chromium compound and aluminum alkoxide compound on a silica support having a pore volume from 2.1 cc/g to 2.9 cc/g.

8. The improved catalyst composition of claim 7 wherein the silica support of said first catalyst component is calcined at a temperature from 1200° F. to 1700° F. before deposition of the chromium and aluminum compounds.

9. The improved catalyst composition of claim 7 wherein the organophosphoryl chromium compound is the reaction product of chromium trioxide and triethyl phosphate and the aluminum alkoxide compound is aluminum sec-butoxide.

10. The improved catalyst composition of claim 7 wherein the second catalyst component contains from 0.75 to 1.25 weight percent chromium.

11. The improved catalyst composition of claim 10 wherein the second catalyst component is obtained by the deposition of chromium acetate on a microspheroidal silica support having a pore volume of 1.6 cc/g to 1.8 cc/g.

12. The improved catalyst composition of claim 11 wherein the first and second catalyst components are separately heat activated by heating in a non-reducing atmosphere at a temperature from 950° F. to 1650° F. for a period of 2 to 12 hours.

13. The improved catalyst composition of claim 11 wherein the first and second catalyst components are combined and co-activated by heating a mixture of the catalyst components in a non-reducing atmosphere at a temperature from 950° F. to 1500° F. for a period of 2 to 12 hours.

* * * * *